United States Patent [19]

McFarland et al.

[11] Patent Number: 5,408,526
[45] Date of Patent: Apr. 18, 1995

[54] CONFERENCE CALLING SYSTEM

[75] Inventors: James R. McFarland, Flemington; Kuang wei Peng, Murray Hill, both of N.J.

[73] Assignee: AT&T Corp., Murray Hill, N.J.

[21] Appl. No.: 968,026

[22] Filed: Oct. 29, 1992

[51] Int. Cl.6 .......................................... H04M 3/56
[52] U.S. Cl. .................................. 379/202; 379/67; 379/114; 379/91; 379/205; 379/207
[58] Field of Search ................ 370/62, 94; 379/112, 379/91, 113, 114, 202, 203, 204, 205, 206, 207, 220, 221, 257, 279, 131

[56] References Cited

U.S. PATENT DOCUMENTS

| 4,585,904 | 4/1986 | Mincone et al. ............... 379/131 |
| 4,796,293 | 1/1989 | Blinken et al. ................. 370/62 |
| 4,954,958 | 9/1990 | Savage et al. ................. 379/207 |

OTHER PUBLICATIONS

"Combinatorial Optimization: Algorithms and Complexity", C. H. Papadimitriou and Kenneth Steiglitz-Cover page, table of contents, and pp. 8–10, Prentice Hall, 1982.
"No. 4 ESS", The Bell System Technical Journal, Sep. 1977, vol. 56, No. 7. Table of Contents and Prologue attached.
"Common Channel Interoffice Signaling", The Bell System Technical Journal, Feb. 1978, vol. 57, No. 2. Table of Contents and An Overview attached.
W. Stallings, "Data and Computer Communications," Chapter 9, Section 9.3, pp. 261,263.
M. Schwartz et al. "Routing Techniques Used in Computer Communication Networks" IEEE Transactions on Communications, Apr. 1980, pp. 539–552.
F. Dijkstra "A Note on Two Problems in Connection with Graphs", Numerical Mathematics, Oct. 1959, pp. 269–271.
L. Ford, et al. "Flows in Networks", Princeton University Press, 1962. Cover page and Table of Contents attached.

Primary Examiner—James L. Dwyer
Assistant Examiner—Scott Wolinsky
Attorney, Agent, or Firm—Barry H. Freedman

[57] ABSTRACT

The initiator of a conference call provides conference requirements such as number and location of parties to be conferenced, time for beginning and end of conference, and telecommunications facilities requirements (e.g., bandwidth requirements for video and multimedia calls), to a conference optimization system (COS). The COS compares the requirements with information in a database, including (a) the cost for each of the paths/routes at the desired time for the conference, (b) available network paths/routes, taking into account the required bandwidth and quality of transmission, and (c) capabilities of the terminal equipment available to the participants. The COS uses a processor such as a microprocessor to identify available network paths/routes for the conference (advantageously with real time input from telecommunications network operations and maintenance systems), select the most cost effective means for initiating the conference, and send information, such as an announcement, to the parties involved in the conference, indicative of the route/path selection. The information required for conference initiation may be provided to a network call controller in order to actually set up the conference without further intervention by the participants.

14 Claims, 7 Drawing Sheets

| ORIGINATING LOCATION | | DESTINATION LOCATION | | COST/UNIT TIME | DISCOUNT |
|---|---|---|---|---|---|
| AREA CODE | EXCHANGE | AREA CODE | EXCHANGE | | |
| 201 | 121 | ⋮ | ⋮ | ⋮ | ⋮ |
| | | 202 | 121 ⋮ 999 | .10 ⋮ .17 | .16 ⋮ .11 |
| | | ⋮ | ⋮ | ⋮ | ⋮ |
| | | 919 | 121 ⋮ 999 | .14 ⋮ .23 | .12 ⋮ .05 |

FIG. 10

CONFERENCE CALLING SYSTEM

FIELD OF THE INVENTION

This invention relates generally to the arrangement of conference telephone calls, and, in particular, to a system and method for optimizing the manner in which conference calls, particularly those involving international locations, are arranged or initiated.

BACKGROUND OF THE INVENTION

The virtual explosion in growth of multi-national companies has led to a dramatic increase in international telecommunications traffic. A significant, and ever increasing part of such traffic is devoted to conference calls, i.e., calls involving three or more parties. The manner in which such conference calls are arranged or initiated depends, among other factors, upon the type of terminal equipment available to the participants. Thus, if one of the participants has a two-line (or multi-line) capability, that party can place one call, put it on hold, place a second (or subsequent) call, and then bridge the two (or more) calls. If two or more participants have the same capability, then one participant can make all of the calls, or several participants can add one or more additional individuals to the conference, thereby in effect sharing the responsibility for initiating the conference among the parties.

The choice of which approach to take is not today made with any degree of consistency nor with any consideration of the advantages that may be obtained if one conference initiation approach is selected over another. In particular, it may turn out that the cost of making a call from point A to point B is less than the cost of making the same call from point B to point A, simply because of the time zone differences at those locations and the fact that the cost of making a call is time sensitive (e.g., evening or night rates are typically cheaper than day rates). "Direction dependent" rates are almost always encountered when international long distance calls are involved. It may also turn out that more (or better quality) circuits are available for telecommunications traffic destined for a foreign country as opposed to the circuits connecting the same endpoints but originating from locations outside of this country.

The situation described above is also true with respect to conference calls made using a conference facility (such as the Alliance Conference Bridge Service available from AT&T) that is located within the telecommunications network and controlled by the telecommunications provider, rather than by using customer premise equipment. In instances in which network based conference bridges are used, there are nevertheless choices that should be made to improve economy and efficiency: which participant should set up the call, which bridge location should be selected as a dominant location, what time the call should be placed, and so on.

SUMMARY OF THE INVENTION

In accordance with the present invention, the initiator of a conference call provides conference requirements such as number and location of parties to be conferenced, time for beginning and end of conference, and telecommunications facilities requirements (e.g., bandwidth requirements for video and multi-media calls), to a conference optimization system (COS). The COS compares the requirements with information in a database, including (a) the cost for each of the paths/routes at the desired time for the conference, (b) available network paths/routes, taking into account the required bandwidth and quality of transmission, and (c) capabilities of the terminal equipment available to the participants. The COS uses a processor such as a microprocessor to identify available network paths/routes for the conference (advantageously with real time input from telecommunications network operations and maintenance systems), select the most cost effective means for initiating the conference, and send information, such as an announcement, to the parties involved in the conference, indicative of the route/path selection. In a preferred embodiment, the information required for conference initiation is provided to a network call controller in order to actually set up the conference without further intervention by the participants. The COS can be used in conjunction with and/or be part of a public telecommunications network, or alternatively be used in and/or be part of a global private telecommunications network.

BRIEF DESCRIPTION OF THE DRAWING

The present invention will be more fully understood by consideration of the following detailed description, which should be read in light of the accompanying drawing in which.

DETAILED DESCRIPTION

Figure 1:
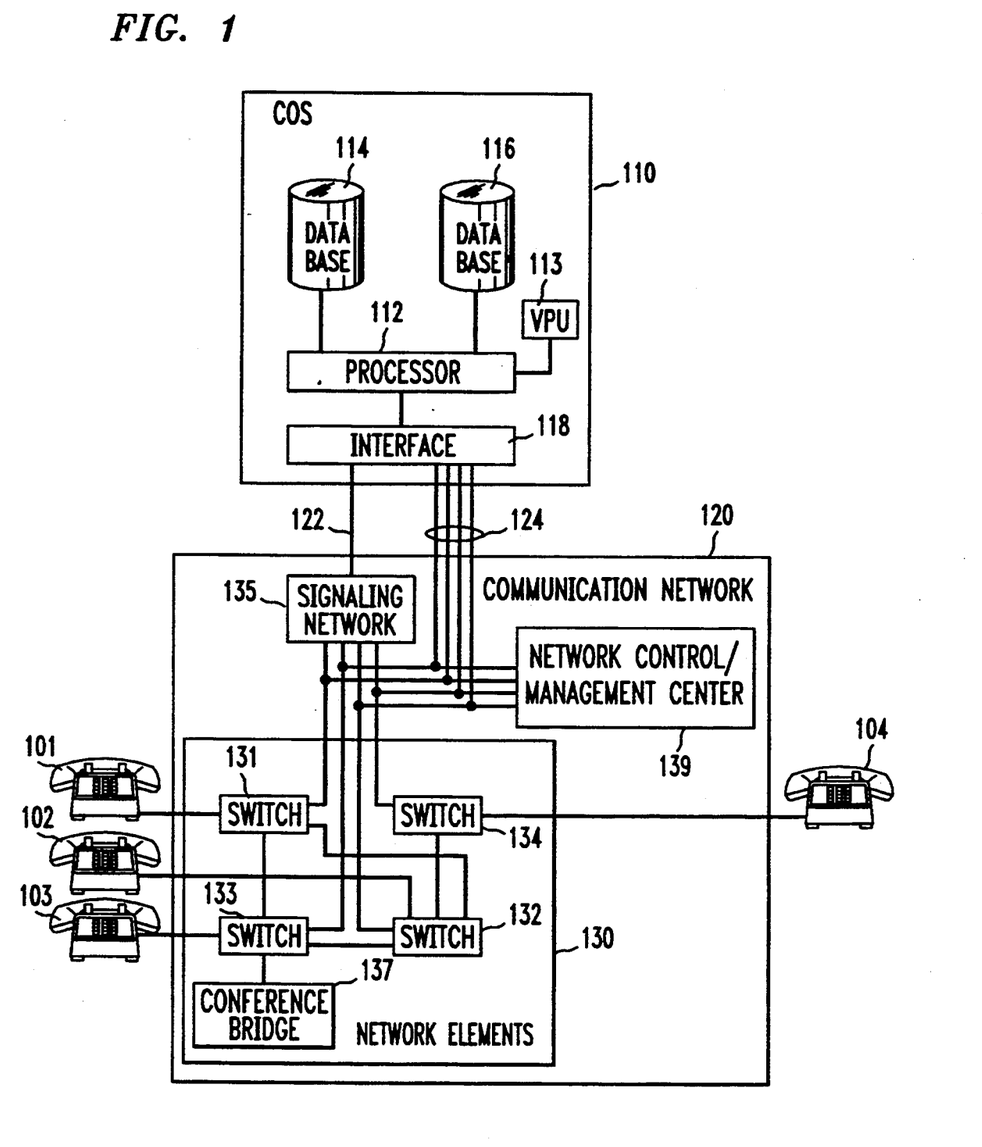
FIG. 1 is an overall block diagram of a system arranged in accordance with the principles of the present invention to optimize the initiation of multiparty conference calls.

Referring first to FIG. 1, there is shown an overall block diagram of the interrelationship between multiple locations 101–104 wishing to participate in a teleconference, and a conference optimization system 110 arranged in accordance with the principles of the present invention to optimize the initiation of the conference calls. Locations 101, 102 and 103 include customer equipment such as a telephone or videophone terminal located in a first country, while location 104 includes terminal equipment such as a telephone located in a foreign location. Each of the locations 101–104 is linked to a particular network element in a communications network designated generally as 120. Thus, location 101 is connected to a first switch 131, location 102 is connected to a second switch 132, location 103 is connected to a third switch 133, and location 104 is connected to yet a fourth switch 134, which may be an international gateway switch. Switches 131, 132 and 133 are interconnected with each other, while switch 134 is connected to switch 132. All switches are connected to a signaling network designated generally as 135. The aforementioned network elements, which are part of an interconnected collection of network elements designated generally as 130, are conventional in nature and individually and collectively well known to persons skilled in the art in terms of description and operation. Elements 130 can be part of the common carder network provided by AT&T, in which case switches 131–133 can be #4ESS ™ electronic switches, while signaling network 135 can be a packet switched communication network for signaling messages, such as AT&T's common channel signaling system (CCS7) network.

Communications network 120 may include one or more facilities for setting up multi-party conferences, such as a conference bridge 137, which is shown connected to switch 133. The function of bridge 137 is to interconnect multiple call legs that are extended to the bridge from various locations. The arrangement and internal operation of a conference bridge is well known to persons skilled in the art. This equipment can be obtained from various vendors such as the Transvox System from Alcatel, the Digital Conference Switching System from AT&T and the Meridian MS-1 System from Northern Telecom.

Communications network 120 may also include one or more network control/management centers 139, which are connected to each of the switches 131–134, and which monitor the operation of the switches and can respond dynamically to changing network traffic conditions. These systems are used for performing Operation, Administration, Maintenance and Provisioning (OAM&P) functions for the network elements.

In accordance with this invention, communications network 120 includes a conference optimization system (COS) 110 arranged to select a particular configuration for network elements 130 that is most efficient to enable conference communications between participants at locations 101–104. For this purpose, COS 110 includes a central processor 112, which may be a microprocessor or microcomputer arranged to operate under control of program instructions (described below in connection with FIG. 7) stored in a first database 114. A voice processing unit 113, described further below, is connected to processor 112 and is available to play appropriate messages to persons using the system, and to receive information input to the COS from such users. Data used in the process performed in processor 112 is stored in a second database 116 connected to processor 112. Typical records stored in database 116 are described in connection with FIG. 9. COS 110 can be linked to network elements 130 in several ways. As shown in FIG. 1, a data communications path 122 links signaling network 135 with processor 112 via an interface system 118, which is arranged to perform any necessary signal and/or format conversion. Alternatively or in addition, switches 131–134 (as well as network control/management center 139) may be linked directly with interface 118 in COS 110 over packet data links, designated 124 in FIG. 1.

FIGS. 2 through 5 illustrate the different topologies in which five locations 201–205 can be interconnected with a conference bridge 210 to form a conference call. In these figures, it is assumed that each of the five locations is connected to a different one of network elements 130, for example, to a different switch. This assumption is generally valid for conference calls in which at least some of the parties in file conference are situated at geographically dispersed locations. Note that if all of the parties in a conference are served by, and/or connected to the same network element, there is, generally speaking, no way of optimizing a conference between such locations. If some of the parties in a conference at a "first location" are served by the same network element, and other parties at different locations are served by different network elements, then the former parties can be "grouped" for the purposes of optimization and considered as a single location, with the present invention then being applicable to (a) the remaining locations and (b) the first location.

Figure 2:
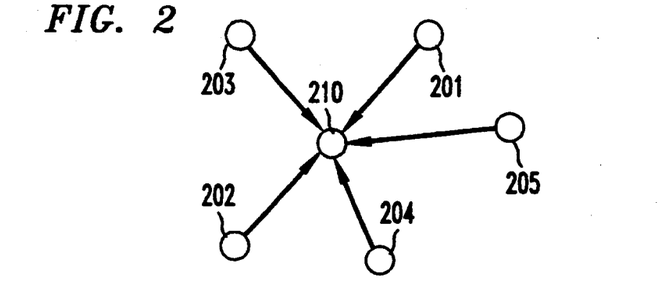
FIGS. 2–5 illustrate possible topologies for multi-location conference calls.
Figure 3:
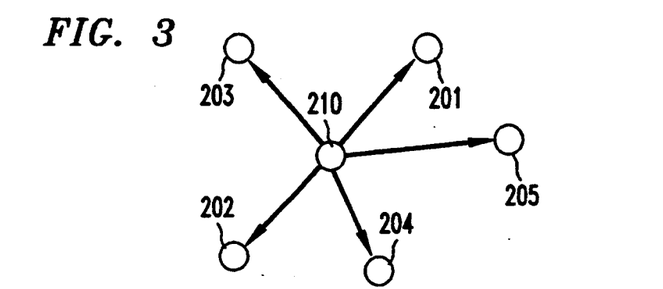
Figure 4:
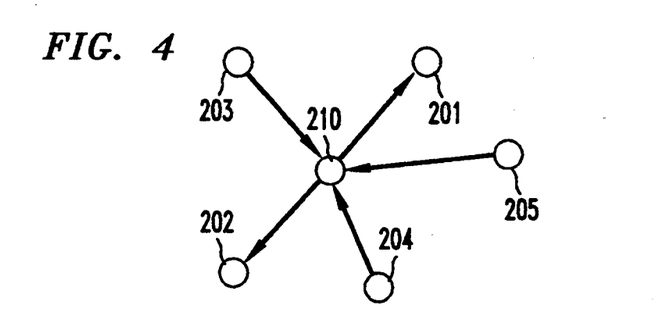

In FIG. 2, a call-in or inward star configuration is shown. In this arrangement, each location 201–205 on the conference calls the single conference bridge 210. In FIG. 3, a call-out or outward star is shown. In this arrangement, an operator or conference originator at conference bridge 210 calls each of the other locations 201–205 on the conference. In FIG. 4, a mixture of the topologies of FIG. 2 and 3 is shown. Here, an operator or conference originator at conference bridge 210 calls some of the locations, e.g., locations 201 and 202, while the other locations 203–205 call into the conference bridge 210. The decision as to which locations call in and which locations are called can strongly affect service availability and economics of the conference.

Figure 5:
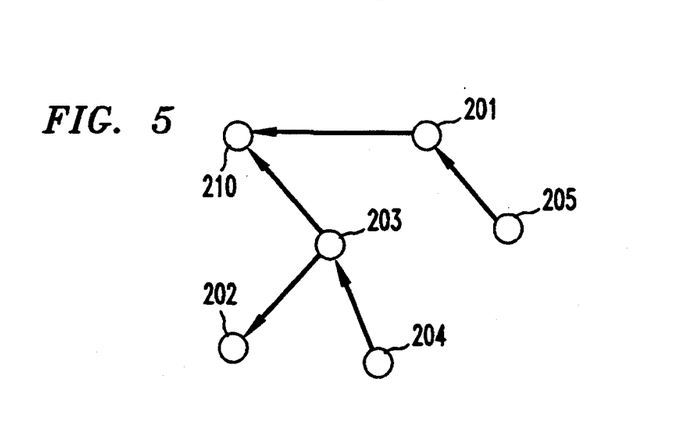

FIG. 5 is a generic topology. Here, there is no conference bridge. Instead, certain locations call other locations, such that a path is established which connects all locations. This topology is the most flexible and relies on call bridging capabilities provided within the locations themselves. These capabilities are currently available in many different types of sophisticated customer premises equipment. The arrangement of FIG. 5, in general, provides the lowest usage based cost for a conference call. However, the method by which the topology is chosen must be carefully determined, as set forth below.

Figure 6:
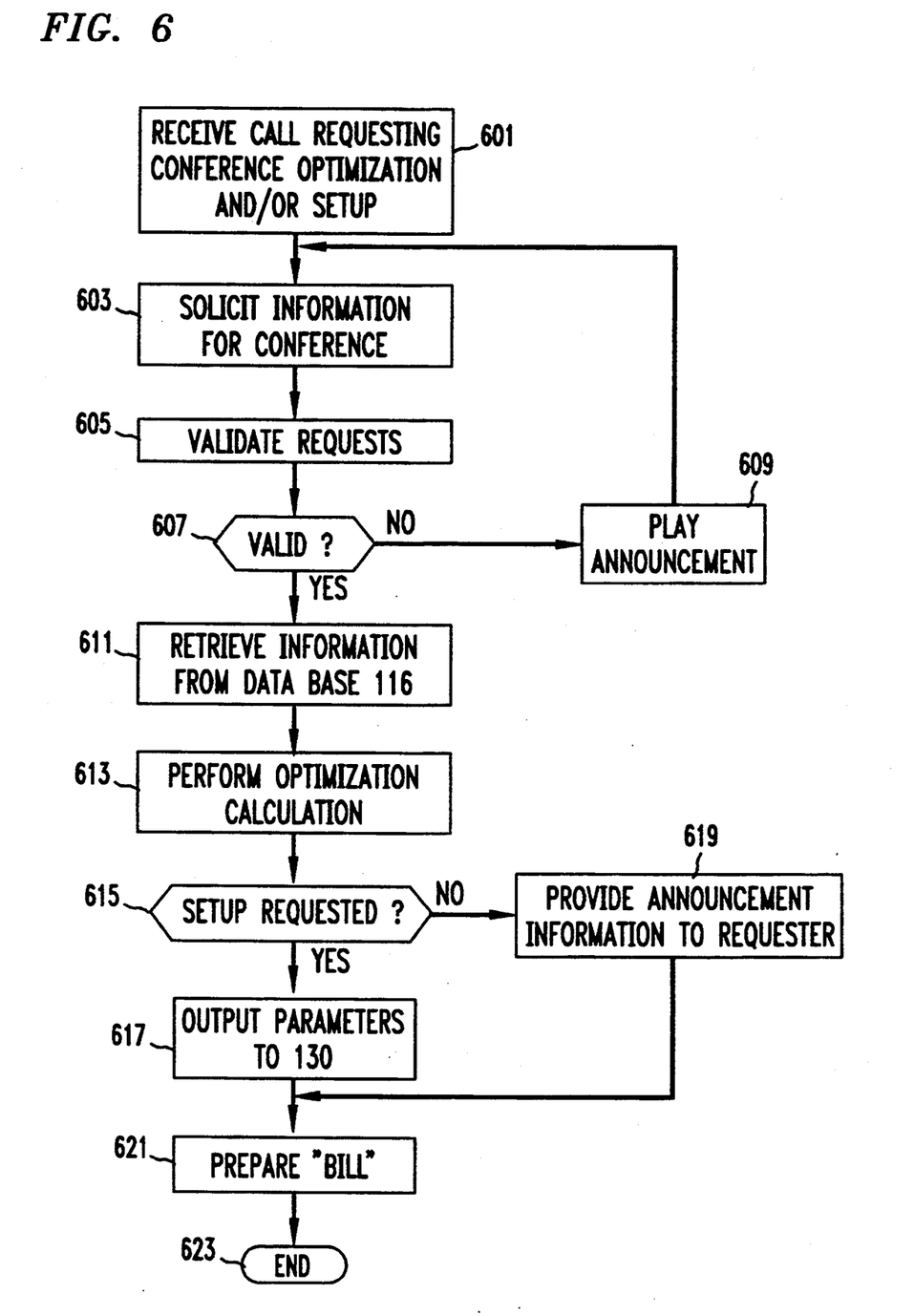
FIG. 6 is a flow diagram illustrating the process followed in processor 112 of FIG. 1 in order to optimize and then initiate, a multi-location conference call.

In accordance with the invention, the steps performed by processor 112 in order to optimize (and thereafter initiate) a multi-location conference call, are illustrated in FIG. 6. The process, under the control of programs stored in database 114, begins in step 601, in which a call is received in processor 112 requesting conference optimization and/or initiation. The manner in which a call is .routed through network 120 is described in more detail below, in connection with FIG. 10. In step 603, information describing the requirements for the desired conference are obtained from the party placing the call, and stored temporarily in database 116. The information obtained in step 603 includes data describing the number and identity of the particular locations to be included in the conference call (e.g., all of the destination telephone numbers), the desired start time of the conference call, the expected duration of the call, and any special telecommunications requirements for the call. In the latter category, for example, would be requirements for a multimedia conference that includes not only voice but also still frame images and/or motion t.v., and data requirements if graphics presentations are to be part of the conference arrangements. Also for certain conferences, packet communications using satellite transmission facilities may be adequate; in other conferences, delay may be unacceptable, so that terrestrial as opposed to satellite based transmission facilities may be necessary. Other information input to processor 112 in step 601 may include terminal identification information and/or characteristics, (e.g., model numbers of specific available CPE or feature information for particular models) potential bridge locations, tariff information, usage sensitive rates based on bandwidth, origin, destination and time of day, and allowed conference topology.

In step 605, the information obtained in the conference set up request in step 603 is validated, to determine that, for example, the individual requesting the conference is authorized to do so, and that the specific locations for the conference are represented by valid telephone numbers. Validation is performed through suitable look-ups in database 116. This step may also involve sending a query to, and receiving a response from, network control/management center 139. This is done, for example, so that information is available in COS 110 indicating if some potential arrangements for the conference are busy or suffering degradations. If some or all of the information is determined to be invalid in step 607, an announcement is played in step 609, requesting that the information be corrected and re-entered. Steps 603, 605 and 607 are then repeated. The announcement is formulated in voice processing unit 113 attached to processor 112, and supplied to the user requesting the conference via interface 118.

If it is determined in step 607 that the information received in step 603 is valid, additional information needed for conference optimization and/or setup is retrieved from database 116 in step 611. For example, specific charges involved in a call from a first location to a second location, and from the second location to the first location, are each determined, using stored tariff information available in database 116. The specific stored information retrieved from database 116 may depend upon time of day information available in processor 112. The same procedure is followed for each set of call legs, that is, for calls between all of the other locations which may serve as origination points or endpoints for the conference. The information retrieved in step 611 is then utilized in step 613 to actually calculate optimized conference characteristics, such as by minimizing the total cost for all legs of the conference call. A more detailed view of the calculation process performed in step 613 is given below, in connection with the description of FIG. 7.

In step 615, a determination is made as to whether call setup was requested by the party setting up the conference in step 601. If so, the parameters needed to actually complete the call are output from processor 112 and applied to network elements 130 via interface 118 in step 617. If not, an announcement is formulated in voice processing unit 113 in step 619, containing verbal information useful in optimizing the conference setup. This information will inform the caller as to the most cost effective arrangement for initiating the conference. In either event, a bill setting forth the charges incurred during the optimization processing may be prepared in step 621, and transmitted to network elements 130 in a manner similar to that used to bill for other toll charges. Note that if the invention is used in a global private network environment, the bill prepared in step 621 may be replaced by a "usage record", which can provide valuable information for internal telecommunications management. The process of FIG. 6 is then terminated in step 623.

Figure 7:
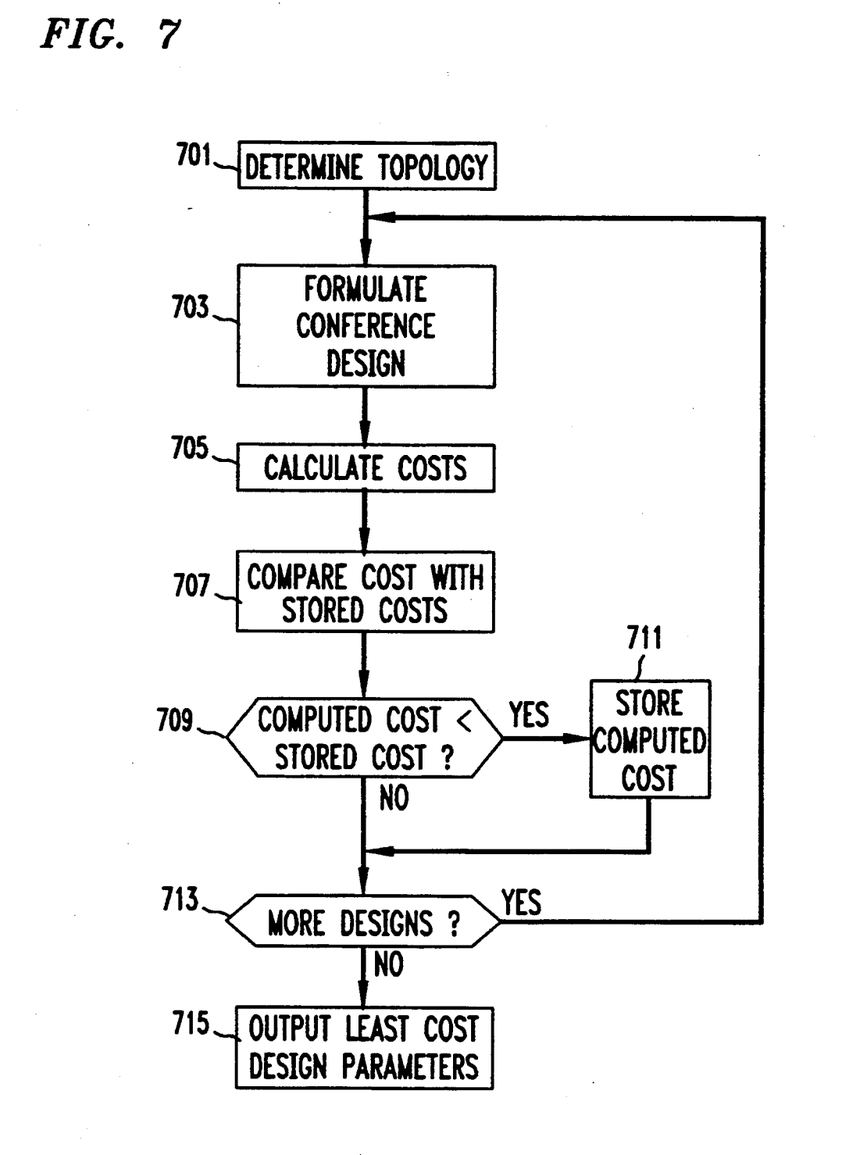
FIG. 7 is a flow diagram illustrating in more detail the process followed in the optimization calculation, step 613 in FIG. 6.

Referring now to FIG. 7, details of the optimization calculation of step 613 are illustrated. The process begins in step 701, in which one or more topologies, such as those illustrated in FIGS. 2-5, are selected for the conference. Selection is based upon several factors, chiefly including the capabilities of the locations from which the calls will be originated. If several topologies can be used, each one is identified.

In step 703, potential conference designs are formulated for each available conference topology. For example, in the topology of FIG. 4, certain locations can originate call legs while other locations can receive calls from the conference bridge. Design formulation takes account of information previously retrieved from network control/management center 139, indicating, for example, that a particular transmission path or network system is overloaded or is providing degraded performance. For each potential design, the cost (or other factors, as discussed below) is computed in step 705, using information retrieved in step 611 of FIG. 6. As explained in more detail below, the cost may be thought of as a summation of the cost of individual call legs, or, alternatively, other computations may be performed. Note that the cost of making a call from the first location in a pair of locations to the second one of the locations in the same pair of locations can be different from the cost of making a call from the second location in the pair of locations to the first one of the locations, due to differences in the pricing of international calls, time zone differences, available discounts, and so on. Accordingly, both costs, i.e., for call originations in both directions, are computed individually. In step 707, the computed cost is compared with a cost previously stored during a previous iteration of the process of FIG. 7. If the computed cost is less than the stored cost, the computed cost is stored in database 116 in step 711. (For the initial iteration, the stored cost is assumed to be infinitely high, so that a positive result is always obtained in step 709 for this iteration.) If the computed cost is not less than the stored cost, or when step 711 is completed, a determination is made as to whether additional conference designs are to be evaluated. If so, the process of FIG. 7, steps 703 to 713, is repeated. If not, the design parameters corresponding to the optimum design are output in step 715, and the optimization computation process terminated.

As noted above, factors other than cost of the conference may be calculated and optimized in the process of FIG. 7. Such factors may include, by way of example, the set-up delay in providing a conference for a large number of conferees, or the "quality" of the facilities available for a multimedia conference. In any of these events, the process of FIG. 7 is essentially the same: the characteristics of the available design options are translated to equivalent numerical values, and the values are optimized, by maximizing (or minimizing) the appropriate variable.

Figure 8:
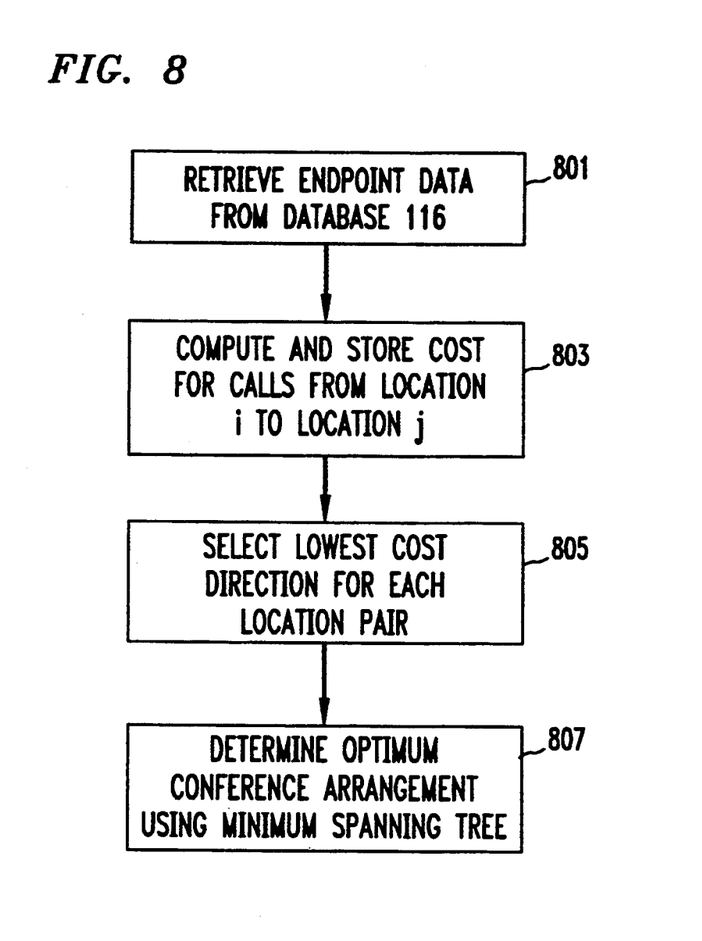
FIG. 8 is a flow diagram illustration an alternative process for optimization calculation.

While the process of FIG. 7 illustrates one specific approach at optimization computation, it is to be understood that various other approaches may be suitable. One such alternative approach is illustrated in FIG. 8. In step 801, data defining the endpoint locations for the conference and the cost per unit time for calling, in both directions, from each endpoint to every other endpoint, is retrieved from database 116. As stated previously, cost per unit time (rate) information is computed by a simple lookup using published tariffs. Note that the rates selected are those that apply for the time of day at which the conference is to be initiated.

In step 803, the dollar cost for each location to location pair is determined, for the expected duration of the call, and the information stored temporarily, in database 116, in the form of a matrix "B". The entries in the matrix take the form B ij, representing the cost to call from location "i" to location "j". In step 805, the lower cost direction between i and j is determined, in order to construct a second matrix "C", such that $C_{ij} = \min[B_{ij}, B_{ji}]$.

Next, in step 807, the matrix C is used to represent the edge costs in order to determine the minimum spanning tree which connects all locations on the conference call. The resulting tree provides the legs of the conference call. The originating location for each leg "ij" is determined from the lower-cost direction between location i and j from step 805. Note that the solution of a minimum spanning tree problem is a well known and easily implemented combinational process that may be performed in processor 112 by suitable programming by persons of ordinary skill in the art. See, for example, "Combinatorial Optimization: Algorithms and Complexity," Papadimitriou and Steiglitz, Prentice Hall, 1982. Other references describe yet other techniques for optimization computation. For example, see "Routing Techniques Used in Computer Communication Networks", Schwartz and Stem, IEEE Transactions on Communications, April, 1980; also "A Note on Two Problems in Connection with Graphs", Dijkstra, Numerical Mathematics, October, 1959; also "Flows in Networks", Ford and Fulkerson, Princeton University Press, 1962.

When the optimization processor is operated in accordance with the invention, calling instructions for each location are generated. For each location, there is listed the other locations to call, or, if applicable, which location will call that location. This information may be provided to the person using the present invention or used to enable processor 112 to formulate and issue to network elements 130, appropriate signaling instructions to initiate the desired (and now optimized) conference. The format and handling of signaling messages that initiate and control call setup and ongoing supervision have been described in many references, and are accordingly well known to persons skilled in the art.

Figure 9:
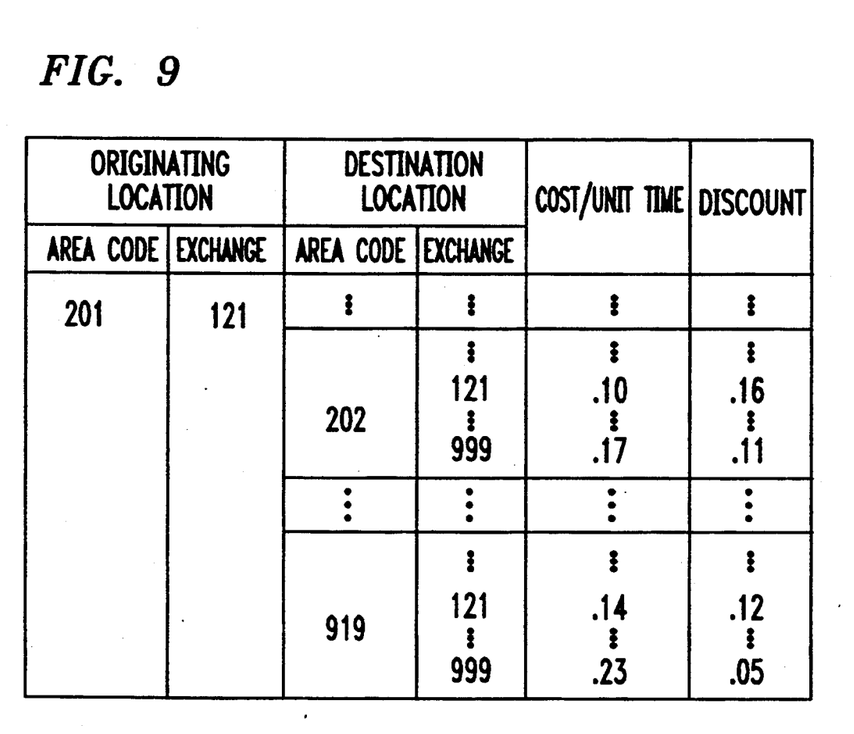
FIG. 9 is a diagram illustrating the fore, at of a typical record stored in database 116 of FIG. 1.

FIG. 9 is a diagram illustrating the typical format of records stored in database 116 of FIG. 1. Each record is indexed by originating location, according to area code and telephone exchange. The record shown in FIG. 9 contains information associated with calls originating from exchange 121 within area code 201. Other records, not shown, contain information for calls originating from other exchanges and other area codes. For the particular area code and exchange illustrated in FIG. 9, possible destinations are all other area codes and all other exchanges in those area codes. A few possible destination locations are specifically illustrated in FIG. 9, namely area code 202, exchanges 121 and 999, and area code 919, exchanges 121 and 999. For each of the destinations shown in FIG. 9, an individual entry in the record sets forth the cost per unit time and the discount associated with that type of call. For example, a call from (201) 121-XXXX to (202) 999-YYYY costs 17 cents per minute, and a discount of 11% may be applicable under certain conditions. A call from the same area and exchange to (919) 121-ZZZZ costs 14 cents per minute, and a discount of 12% applies. The information in each record, although not shown in FIG. 9, may also describe other applicable factors for calls made between particular origination and destination locations, such as overrides, taxes, surcharges, currency exchange information, etc. Also, the records in database 116 may contain information describing characteristics and features available in certain customer premises (terminal) equipment.

Figure 10:
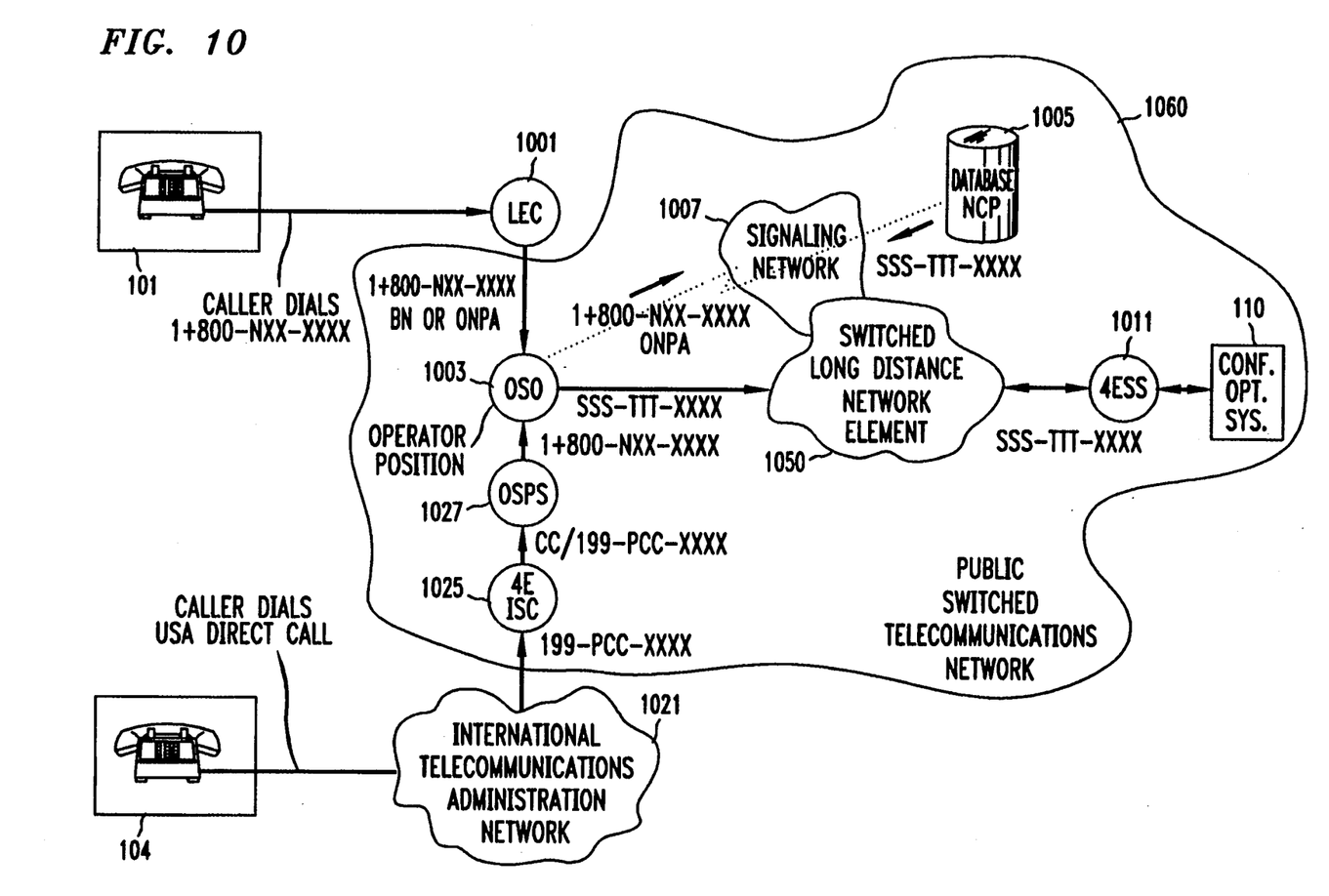
FIG. 10 is a diagram illustrating the manner in which a call requesting conference optimization can be routed to COS 110 from a domestic location and from a foreign location.

FIG. 10 is a diagram illustrating the manner in which a call requesting conference optimization can be routed to COS 110 from domestic and foreign locations. If the call originated from location 101 within the United States, the caller will dial a specific toll free access number in the format 1-800-NXX-XXXX, where N is a digit between 2-9 and X is any digit 0-9. The call is received by a local exchange carrier (LEC) office 1001 associated with the calling location and recognized (using conventional equal access screening) as a call to be routed by a particular long distance carrier, such as AT&T. Accordingly, LEC office 1001 forwards the dialed 800 number to an AT&T Originating Screening Office (OSO) 1003 along with a 10 digit billing number (BN) or, if the BN cannot be determined, a 3 digit Originating Numbering Plan Area (ONPA). (The 3 digit code is commonly called the originating "area code".) The BN or ONPA information is normally transmitted from LEC office 1001 to OSO 1003 by multi frequency tones; CCS7 signaling may alternatively be used, if available. Note that if LEC office 1001 is not equipped for equal access, the originating NPA code can be derived from either the incoming trunk subgroup information or from a code transmitted by the LEC in place of the digits "800".

OSO 1003 retains the 10 digit BN (or 3 digit ONPA) and sends a query to Inwats Data Base Network Control Point (IDB NCP) 1005 over the signaling network 1007, using the dialed number and the ONPA, where the customer record corresponding to the information in the query is retrieved. IDB NCP 1005 returns an Action Point Numbering (APN) number of the form SSS-TIT-XXXX, where SSS is the switch number of the particular switch (switch 1011 in FIG. 10) within network 120 to which COS 110 is connected. TIT is the trunk subgroup for receiving conference setup requests at that switch, and XXXX is a specific four digit number associated with the optimization features provided by the present invention.

The call is now routed through various ones of the network elements 1050 within public switched telecommunications network 1060 and delivered to the appropriate trunk subgroup of switch 1011 corresponding to COS 110.

If the request for conference optimization originated from location 104 in a foreign country, the caller may dial a direct access number of a particular long distance carrier, illustratively AT&T, in that country. The telecommunications administration network 1021 of that country routes the call to the designated long distance provider with a called party number of 199-PCC-XXXX, where 199 indicates direct access service and PCC indicates the country of origin. XXXX may contain information about the originating station. The call is received by the designated long distance provider in a switch 1025 such as a #4ESS international switching center (ISC), which routes the call to a operator service position system (OSPS) 1027, based on the received number. OSPS 1027 stores the 199-PCC-XXXX as the backward number for the call. When the call is answered at OSPS 1027, the caller first provides a credit card number (to pay for the direct access portion of the call). After optional credit card validation, the caller provides the same dial-in 800 number as was used with respect to a domestically originated call. OSPS 1027 forwards the dialed 800 number in standard international call format, namely, in the ISUP called party number parameter, and places NPA-CCC-XXXX in the charge number parameter, where NPA is the NPA of OSPS 1027. The call flow continues from here as was described previously.

Regardless of the location that requested the conference origination, after COS 110 determines the optimum configuration for the conference, conference setup may proceed automatically by COS preparing and sending signaling messages via signaling network 1007 to appropriate network elements 1050. Alternatively, an operator position may be provided with information that is then used to connect the locations in the desired and optimized manner.

We claim:

1. A method of setting up a conference call between a plurality of participants at geographically dispersed locations, comprising the steps of:
    obtaining information identifying each of said locations;
    retrieving information from a database specifying the cost of communications originating from each of said locations;
    computing, using said retrieved information, the cost of routing communications between each of said locations and other ones of said locations; and
    selecting a routing arrangement for said conference as a function of said computed cost information.

2. The invention defined in claim 1 where said retrieving step includes, for each pair of locations, retrieving information indicating the cost of calling from the first location in said pair of locations to the second one of the locations in said pair of locations, and the cost of calling from the second location in said pair of locations to the first one of the location in said pair of locations.

3. The method defined in claim 1 further including the step of storing information in a database indicative of the rates per unit time applied to communications originated from each of said locations.

4. The method defined in claim 1 wherein said information obtaining step includes querying at least one of said participants for information describing each of said locations by playing an announcement to said at least one participant.

5. The method defined in claim 4 further including the step of providing information, including an announcement, to said at least one participant indicative of said least cost routing arrangement for said conference.

6. The method defined in claim 1 wherein the method further includes providing information required for conference initiation to a network call controller in order to set up the conference without further input from said at least one participant.

7. The method defined in claim 1 wherein said information obtaining step includes obtaining information relating to telecommunications requirements for said conference.

8. Apparatus for setting up a conference call between a plurality of participants at geographically dispersed locations, comprising:
    means for obtaining information identifying each of said locations;
    means for retrieving information from a database specifying the cost of communications originating from each of said locations;
    means for computing, using said retrieved information, the cost of routing communications between each of said locations and other ones of said locations; and
    means for selecting a routing arrangement for said conference as a function of said computed cost information.

9. The invention defined in claim 8 where said retrieving means is arranged to retrieve, for each pair of locations, information indicating the cost of calling from the first location in said pair of locations to the second one of the locations in said pair of locations, and the cost of calling from the second location in said pair of locations to the first one of the location in said pair of locations.

10. The invention defined in claim 8 further including means for storing information in a database indicative of the rates per unit time applied to communications originated from each of said locations.

11. The invention defined in claim 8 wherein said information obtaining means includes means for querying at least one of said participants for information describing each of said locations by playing an announcement to said at least one participant.

12. The method defined in claim 11 further including means for providing information, including an announcement, to said at least one participant indicative of said least cost routing arrangement for said conference.

13. The invention defined in claim 8 further including means for providing information required for conference initiation to a network call controller in order to set up the conference without further input from said at least one participant.

14. The invention defined in claim 8 wherein said information obtaining means includes means for obtaining information relating to telecommunications 3 requirements for said conference.

* * * * *